United States Patent [19]

Ballocca

[11] Patent Number: 4,765,936
[45] Date of Patent: Aug. 23, 1988

[54] METHOD FOR THE MANUFACTURE OF A WEATHER STRIP FOR MOTOR VEHICLES

[75] Inventor: Guido Ballocca, Turin, Italy
[73] Assignee: S.A.I.A.G. S.p.A., Cirie, Italy
[21] Appl. No.: 848,007
[22] Filed: Apr. 3, 1986
[30] Foreign Application Priority Data
 Apr. 3, 1985 [IT] Italy ............................. 67329 A/85
[51] Int. Cl.[4] ............................................ B29C 47/56
[52] U.S. Cl. .................................. 264/46.1; 264/145; 264/163; 264/167; 264/177.1; 264/177.16; 425/4 C; 425/131.1; 425/381
[58] Field of Search ............... 264/177.1, 177.16, 146, 264/145, 163, 167, 46.1; 425/131.1, 4 C, 381

[56] References Cited

U.S. PATENT DOCUMENTS

| | | | |
|---|---|---|---|
| 2,720,679 | 10/1955 | Ratliff | 425/466 |
| 2,891,288 | 6/1959 | Daley | 264/146 |
| 3,278,988 | 10/1966 | Hannis | 425/466 |
| 4,292,019 | 9/1981 | Hay et al. | 425/466 |
| 4,313,327 | 2/1982 | O'Connor | 425/466 |
| 4,419,315 | 12/1983 | Kessler | 425/465 |
| 4,531,326 | 7/1985 | Ballocca et al. | 425/466 |
| 4,576,773 | 3/1986 | Azzola et al. | 425/465 |
| 4,584,150 | 4/1986 | Ballocca | 264/167 |

FOREIGN PATENT DOCUMENTS 59-101314 11/1984 Japan ................................. 264/167

Primary Examiner—Jeffery Thurlow
Attorney, Agent, or Firm—Sughrue, Mion, Zinn, Macpeak, and Seas

[57] ABSTRACT

The method enables the manufacture of a weather strip including a profiled section with a cross-section in the form of a web terminating in a head, the extent of the web being variable between a minimum value and a maximum value. For this purpose, an extrusion is formed which includes a tab part having a transverse extent greater than the maximum value: immediately the tab has been extruded, it is divided into first and second flows of extruded material; the section of the first of these flows has an area at least equal to the area of the section of the profiled section of the weather strip to be manufactured. The proportions into which the tab is divided in the two flows are altered in dependence on the advance of the extrusion, in correspondence with the variations in the transverse extent of the web of the profiled section it is desired to produce. The distal transverse portion of the first flow is then gradually moulded so as to give it the cross-section of the head portion of the profiled section to be formed.

1 Claim, 3 Drawing Sheets

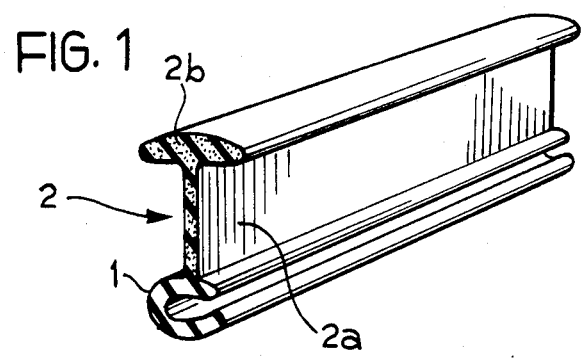
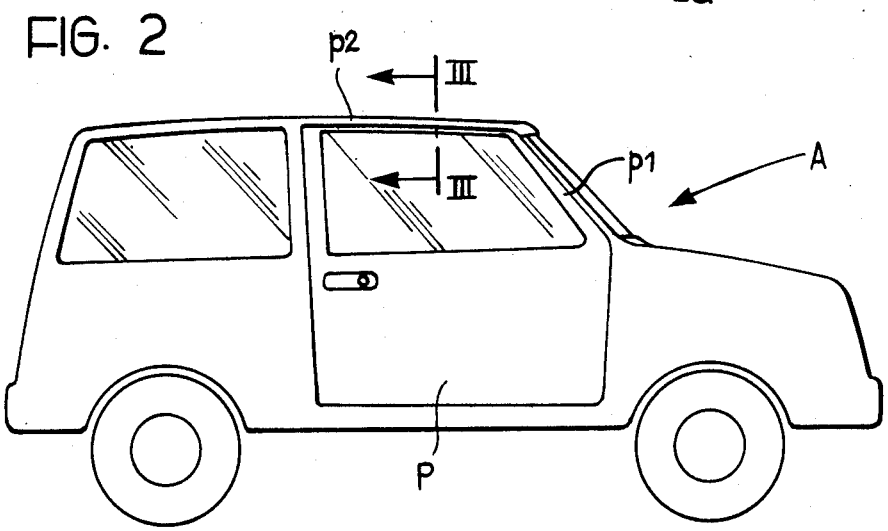
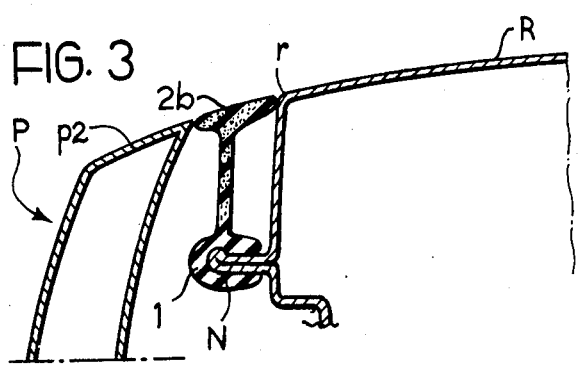
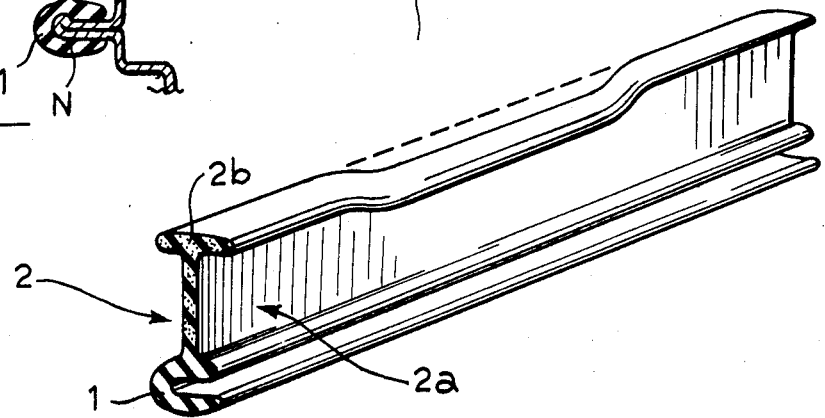

METHOD FOR THE MANUFACTURE OF A WEATHER STRIP FOR MOTOR VEHICLES

BACKGROUND OF THE INVENTION

The present invention relates to a method for the manufacture of a weather strip for motor vehicles. In particular, the invention concerns a method for the manufacture of a weather strip including a profiled section with a cross-section in the form of a web terminating in an enlarged head, the extent of the web of the profiled section being variable between a minimum value and a maximum value in a predetermined manner along the length of the weather strip.

FIG. 1 illustrates in perspective a piece of weather strip of the type specified above, comprising a substantially channel-shaped anchoring section 1, for example of hard elastomeric material, and a sealing section, for example of spongy elastomeric material, indicated 2. As shown in the drawing, the cross-section of the sealing section is essentially in the form of a web 2a terminating in an enlarged end or head portion 2b. Such a weather strip can be used, for example, as the air-tight member and aesthetic connecting member between the front pillars and upper cross member of a front door of a motor vehicle and the corresponding edge of the motor vehicle body, as illustrated in FIGS. 2 and 3. FIG. 2 illustrates schematically a motor vehicle A provided with front doors P of the so-called "wrap-over" type, that is, the type in which the upper edge of the door is located above the gutter and joins substantially with the roof R of the motor vehicle, as seen in FIG. 3. A weather strip of the type illustrated in FIG. 1 is conveniently located in the interspace between the upper edge $p_2$ of the door P and the corresponding edge r of the roof R of the motor vehicle; at a certain distance from the upper edge r of the roof R a rib N is formed by pressing of the sheet metal forming the roof and the anchoring section 1 of the weather strip is snap-engaged onto it. The head or enlarged portion 2b of the weather strip closes the interspace between the door and the roof with an air-tight seal. The weather strip is conveniently mounted along the edge of the body intended to face the front pillar $p_1$ of the door and the upper edge $p_2$, as shown in FIG. 2. The air-tightness is especially important, particularly in correspondence with the pillar $p_1$, since air penetrating the interspace between the door and the body during forward movement of the vehicle would tend to cause considerable aerodynamic noise.

In practice, it is not always possible to form the engagement rib N at the same distance from the edge r of the roof R. Consequently, with the use of a weather strip of the type shown in FIG. 1, that is with a web 2a of constant height, some zones of the weather strip will be slightly sunken while other zones will be slightly raised when the weather strip is in use.

These disadvantages could be overcome if it were possible to make, in a simple, precise, rapid and cheap manner, a weather strip of the type shown in FIG. 4, that is, a weather strip whose sealing section can have a web 2a with a height which differs locally in correspondence with variations in the distance between the rib N and the edge r of the body.

Clearly, a weather strip of this type may be made by moulding. However, this solution is extremely expensive, particularly when it is wished to make weather strips with two parts formed from materials of different hardnesses.

SUMMARY OF THE INVENTION

An object of the invention, therefore, is to provide a method which allows such a weather strip to be manufactured precisely, rapidly and extremely cheaply.

This object is achieved according to the invention by a method characterised in that it includes the steps of:

extruding an extrusion including a tab part with a transverse extent greater than the maximum value;

dividing the tab immediately after extrusion into first and second flows of extruded material, the cross section of the first flow having an area at least equal to the area of the cross-section of the profiled section of the weather strip to be formed;

altering the proportions in which the tab is divided into the first and second flows in dependence on the advance of the extrusion in correspondence with the variations in the transverse extent of the limb of the profiled section which it is desired to form, and gradually moulding the transverse distal portion of the first flow so as to give it the cross-section of the head portion of the profiled section.

The invention also relates to a device for manufacturing a weather strip of the type specified above.

Further characteristics and advantages of the invention will become apparent from the detailed description which follows with reference to the appended drawings.

BRIEF DESCRIPTION OF THE DRAWINGS

FIG. 1, already described, is a perspective view of a piece of a weather strip with a sealing section of constant height, FIG. 2, already described, is a side view of a motor vehicle, FIG. 3, already described, is a section taken on the line III—III of FIG. 2, FIG. 4, already described, is a perspective view of a off-cut portion of weather strip according to the invention.

DETAILED DESCRIPTION OF THE INVENTION

Figure 5:
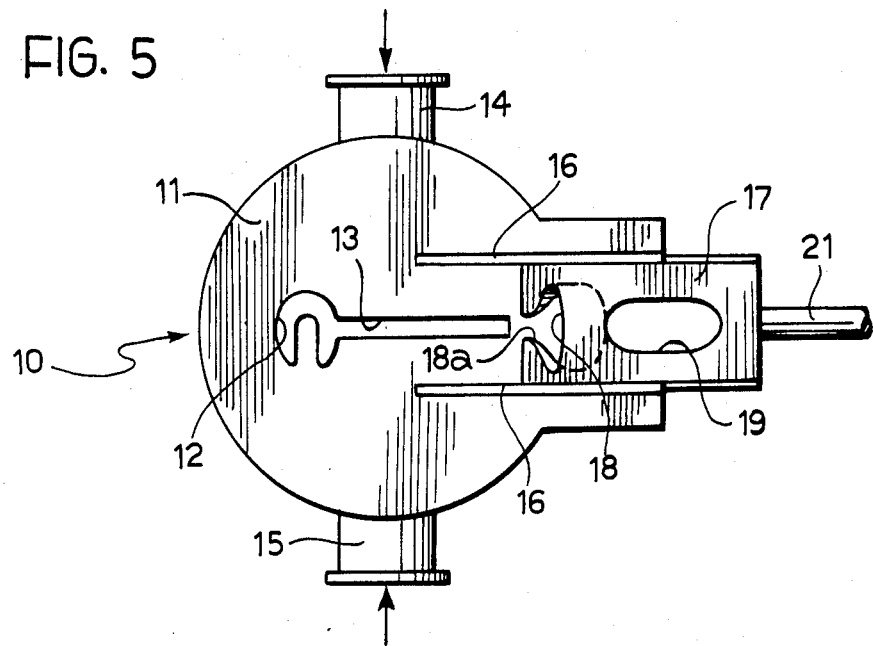
FIG. 5 is a device for manufacturing a weather strip of the type shown in FIG. 4, FIGS. 6 to 8 show a member of the device of FIG. 5 from the front, from the rear, and in section along the line VIII—VIII of FIG. 6, respectively.
Figure 9:
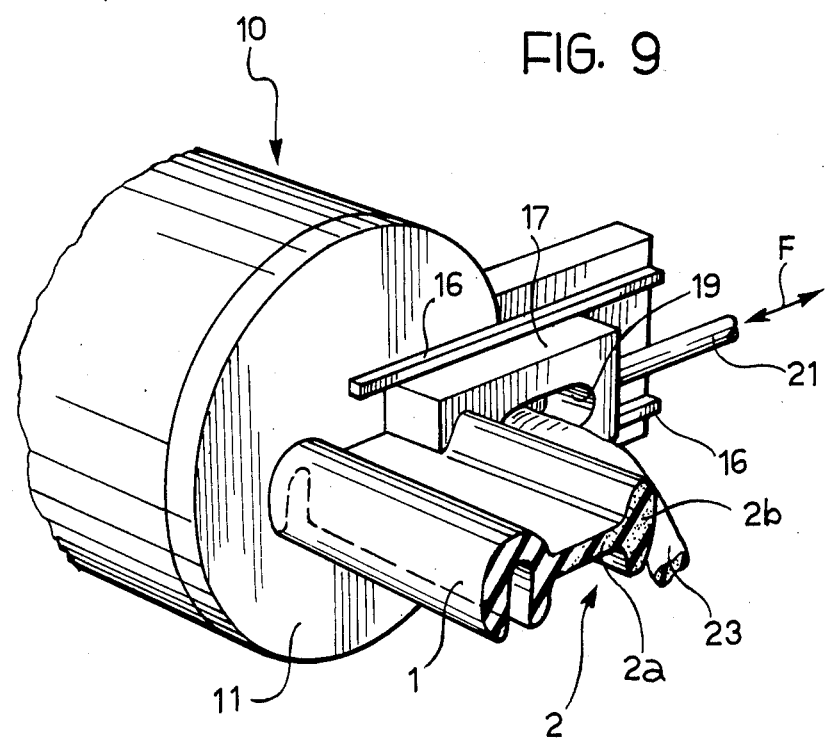
FIG. 9 is a perspective view showing the device of FIG. 5 during the manufacture of a weather strip.
Figure 6:
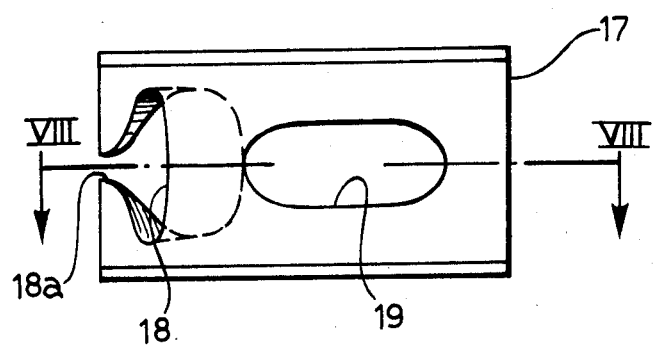

FIGS. 5 and 9 show a device adapted to enable the manufacture of weather strips of the type specified above, with the sealing section having a web of variable height.

The device includes an extrusion head, generally indicated 10, having an extrusion die 11 with a first aperture 12 whose form corresponds substantially to the cross-section of the anchoring section 1 of the weather strip to be formed. The aperture 12 communicates with a further aperture 13 (FIG. 5) of elongate rectangular shape. This aperture has a height substantially equal to the thickness of the portion 2a of the anchoring section of the weather strip to be formed and a length which is greater than the maximum height envisaged for the web 2a of the profiled section of the weather strip to be formed. The open cross-section of the aperture 13 has an area at least equal to the area of the maximum cross-section envisaged for the sealing section of the weather strip to be formed.

A hard elastomeric material for forming the anchoring section 1 and a cellular elastomeric material for forming the sealing section are fed through ducts 14 and 15 to the extrusion head 10 in known manner.

In the embodiment shown by way of example, two guides 16 are provided on the front face of the extrusion die 11, which extend parallel to each other and to the direction of the major axis of the aperture 13. These guides are arranged on opposite sides of the aperture. A substantially parallelipedal body, is sealingly slidable along these guides in contact with the front face of the extrusion die 11. The body 17 has two apertures 18, 19 which extend between its major faces. The aperture 19 has a substantially constant section. The aperture 18 has a section which decreases gradually from the rear face to the front face of the body 17. A notch 18a is formed in the wall of the aperture 18 and opens in correspondence with the lateral face of the body 17 facing the aperture 13 of the extrusion die. The distance between the edges of the notch 18a corresponds to the smaller dimension of the aperture 13 and the edges of this notch are aligned with the longer sides of the aperture 13, as shown in FIG. 5.

In correspondence with the front face of the body 17, the aperture 18 has a profile or contour substantially corresponding to the profile of the head or enlarged portion 2b of the sealing section 2 of the weather strip to be formed.

Figure 7:
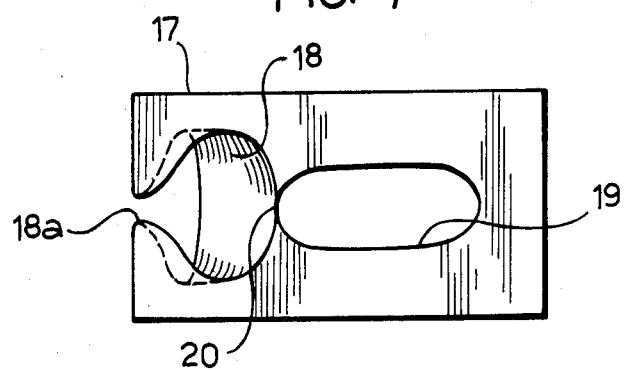
Figure 8:
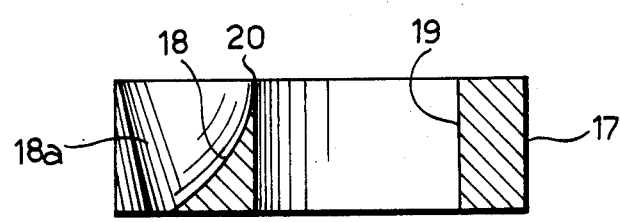

In correspondence with the rear face of the body 17, the apertures 18 and 19 touch along a substantially straight tract, indicated 20, having a length at least equal to the smaller dimension of the aperture 13 of the extrusion die (FIGS. 7 and 8).

In correspondence with the rear face of the body 17, the distance between the tract 20 along which the two apertures touch and the lateral face of the body 17 in which the notch 18a is formed is such that, in operation, the portion of the aperture 13 facing the aperture 18 has an area at least equal to, and preferably greater than, the area defined by the front profile of the aperture 18.

As is apparent from FIGS. 5 and 9, the body 17 is fixed to a shaft 21 through which drive means of conventional type, not shown, can cause its movement in the direction of the arrows F of FIG. 9 relative to the extrusion head 10.

In operation, an extrudate leaves the extrusion orifice constituted by the apertures 12 and 13 and includes a portion constituting the anchoring section 1 and a second portion in the form of a straight tab. This tab is divided into two parts by the tract 20, along which the apertures 19 and 18 touch, in correspondence with the rear face of the body 17. The tab is thus divided into two flows of extruded material; the first flow is connected to the portion constituting the anchoring section 1 and its distal end is gradually moulded by the wall of the aperture 18 until, at the outlet from this aperture, it takes on the form of the head 2b of the sealing section. The second flow of extruded material, indicated 23 in FIG. 9, is discharged or recovered and returned to the extrusion head.

The proportions in which the tab leaving the aperture 13 is divided into the two flows defined above, and consequently the transverse extent or height of the web 2a of the sealing section of the resulting weather strip, are varied in accordance with the position assumed by the body 17 relative to the extrusion head 10 in use.

In order to synchronise the movement of the body 17 with the advance of the extrusion emerging from the extrusion head 10, use may be made of the apparatus and method described, for example, in Italian Patent Applications Nos. 67365-A/83 and 67183-A/83 in the name of the same Applicants.

Naturally, the principle of the invention remaining the same, the forms of embodiment and details of realization may be varied widely with respect to those described and ilustrated purely by way of non-limiting example, without thereby departing from the scope of the present invention.

I claim:

1. A method for the manufacture of a weather strip for motor vehicles, of the type including a profiled section having a cross-section in the form of a web with an enlarged end or head portion, the transverse extent of the web of the profiled section being variable between a minimum value and a maximum value in a predetermined manner along the length of the weather strip, wherein the method includes the steps of:

extruding an extrudate including a tab part with a transverse extent greater than said maximum value;

dividing the tab immediately after extrusion into first and second flows of extruded material, the first flow having a cross-section with an area at least equal to the area of the cross-section of the profiled section of the weather strip to be formed;

altering the proportions in which the tab is divided into the first and second flows in dependence on the advance of the extrudate, in correspondence with the variations in the transverse extent of the web of the profiled section which it is desired to form, and gradually moulding a transverse distal portion of the first flow adjacent the second flow so as to give it the uniform cross-section of the head portion of the profiled section regardless of the transverse extent of the web.

* * * * *